H. H. FREY.
CARBURETER ADJUSTING MECHANISM.
APPLICATION FILED NOV. 11, 1911.

1,146,322.

Patented July 13, 1915.
2 SHEETS—SHEET 1.

WITNESSES
Ernest W Davis
Robert F. Bracke

INVENTOR:
HERBERT H. FREY
BY Brown & Williams
ATTORNEYS

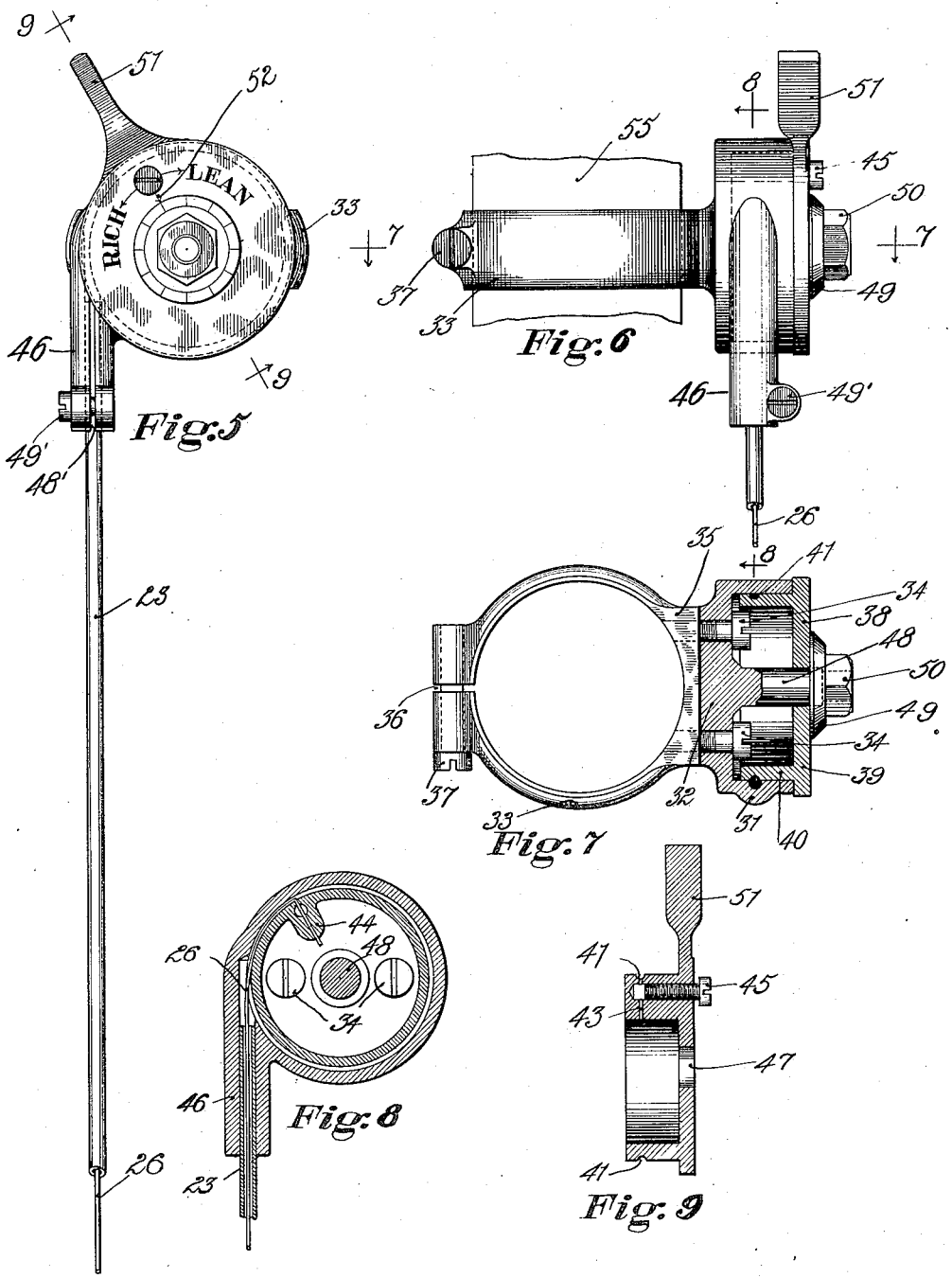

UNITED STATES PATENT OFFICE.

HERBERT H. FREY, OF CHICAGO, ILLINOIS, ASSIGNOR TO STROMBERG MOTOR DEVICES COMPANY, OF CHICAGO, ILLINOIS, A CORPORATION OF ILLINOIS.

CARBURETER-ADJUSTING MECHANISM.

1,146,322.

Specification of Letters Patent.

Patented July 13, 1915.

Application filed November 11, 1911. Serial No. 659,734.

*To all whom it may concern:*

Be it known that I, HERBERT H. FREY, a citizen of the United States, residing at Chicago, in the county of Cook and State of Illinois, have invented certain new and useful Improvements in Carbureter-Adjusting Mechanisms, of which the following is a full, clear, concise, and exact description, reference being had to the accompanying drawings, forming a part of this specification.

My invention relates to carbureters and is particularly concerned with adjusting mechanism therefor. More specifically, my invention has to do with carbureters employed in automobiles and its object is to provide improved adjusting mechanism which is in a convenient position for the driver of a car and which may have this advantage regardless of the disposition of the carbureter itself.

I have found that a very advantageous position for any carbureter adjusting mechanism is upon the steering column and considerable difficulty has been encountered in the prior art, in attempts to obtain such an advantage, in view of the numerous adjusting and controlling devices already associated therewith.

In the structure of my invention, the steering column does no more than to support the adjusting lever or handle and the directly associated parts, and a flexible mechanical connection operatively unites this adjusting lever or handle with the adjustable part in the carbureter.

I have illustrated a certain kind of carbureter and in this use a unique form of connection between the flexible element and the adjustable part is utilized, and, in the more limited appended claims, I bring out these specific features.

Thus, my invention is peculiarly adapted to automobiles, and, when considered in connection with this industry, it will be seen to have numerous features of advantage and peculiar adaptabilities heretofore unheard of.

My invention secures results not obtained by any of the structures of the prior art and all this may be had by means of a simple inexpensive arrangement.

My invention is illustrated in the accompanying drawings, in which—

Figure 1:
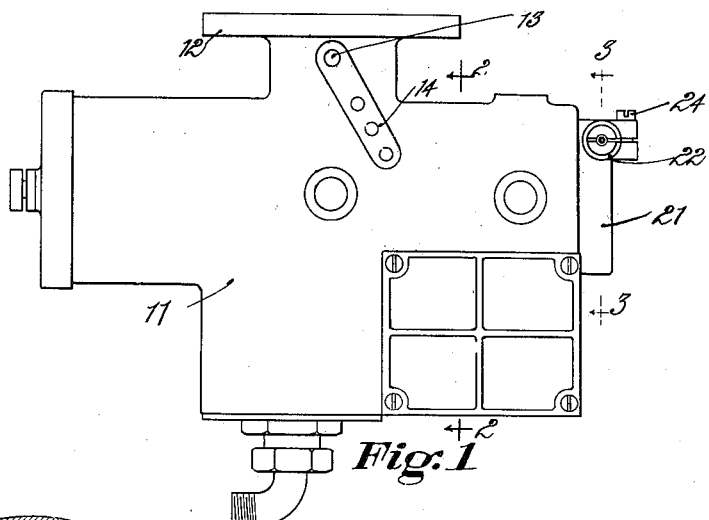
Figure 2:
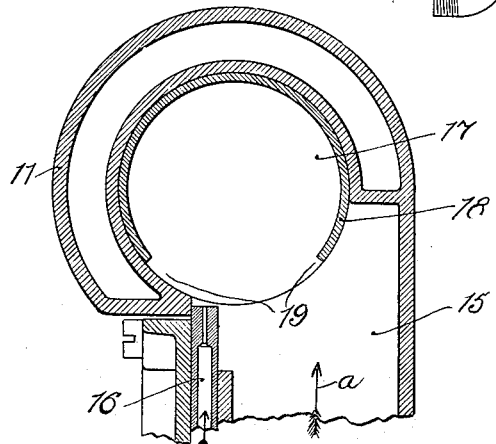
Figure 3:
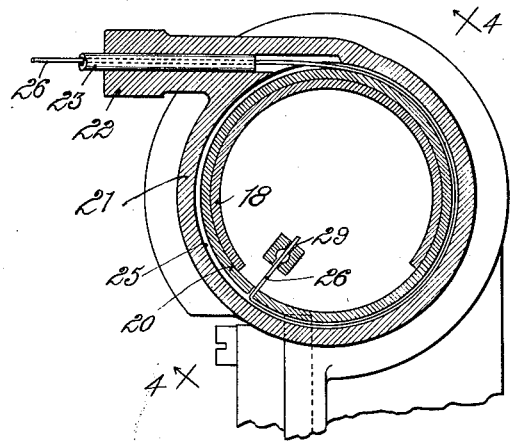
Figure 4:
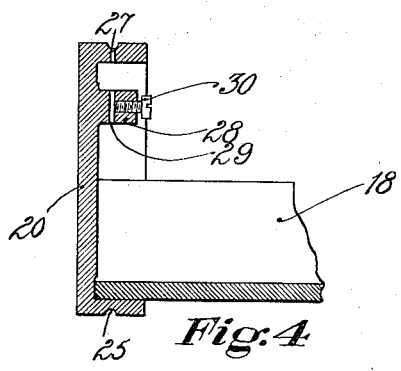
Figure 10:
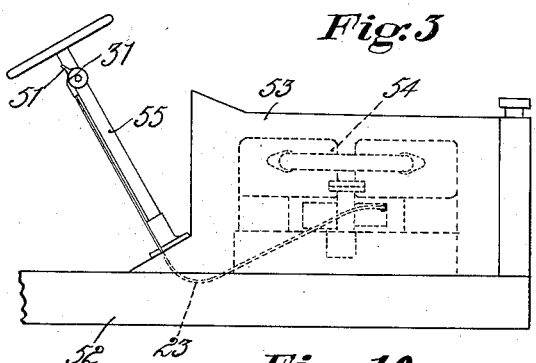

Figure 1 is an elevational view of the carbureter shown and described in detail in my copending application, Serial No. 633,492, filed June 16, 1911; Fig. 2 is a cross-sectional view taken on the plane of the line 2—2 of Fig. 1 and looking in the direction indicated by the arrows; Fig. 3 is a cross-sectional view taken on the plane of the line 3—3 of Fig. 1 and looking in the direction of the arrows; Fig. 4 is a partial cross-sectional view taken on the plane of the line 4—4 of Fig. 3 and looking in the direction indicated by the arrows; Fig. 5 is a side elevational view of the adjusting mechanism which is employed upon the steering column of an automobile; Fig. 6 is a front elevational view thereof; Fig. 7 is a view of the structure illustrated in Fig. 6, shown partly in plan and partly in section on the plane of the line 7—7 of Fig. 6; Fig. 8 is a sectional view taken on the plane of the line 8—8 of Fig. 6, looking in the direction indicated by the arrows; Fig. 9 is a partial sectional view taken on the plane of the line 9—9 of Fig. 5 and looking in the direction indicated by the arrows; and Fig. 10 is a view of the forward part of an automobile illustrated in the connection between the adjusting mechanism on the steering column and the carbureter.

Referring first to Figs. 1 to 4, inclusive, it will be seen that the carbureter casing is shown at 11 and that the flange which is connected with the manifold of the engine is illustrated at 12. The passageway to the manifold is controlled in the usual way by means of a throttle mounted upon a shaft 13, which carries the operating lever 14 which in turn is connected with the accelerator of the automobile. It will be unnecessary to go into a detailed description of the carbureter in order to understand the present invention. Suffice it to point out that, as shown in Fig. 2, the air is supplied through a passageway 15, as indicated by the arrow *a*, and the fuel is supplied through a passageway 16, as indicated by the arrow *b*. The air passage 15 leads to a cylindrical chamber 17 in which a snugly fitting sleeve 18 is set with a bearing fit so that it may be rotated about its own axis and, as shown in Fig. 2, it is cut out as indicated at 19 to form a passageway so that by its rotation the connection between the air passage 15 and the cylindrical chamber 17 eventually connects with the passage to the engine and it will be seen, since the fuel passage remains constant, that the rotation of the sleeve 18 results in the adjustment of the amount of air in proportion to the amount of fuel.

As shown in Fig. 4, the sleeve member 18 is provided with a cylindrical head 20, with which it has a driving fit, and this head is mounted snugly in a cylindrical auxiliary casing 21 supplementing the main casing 11 at the end thereof. This supplementary casing has the tangential extending boss 22 in which the end of a flexible tube 23 may be clamped by means of a set-screw 24. The periphery of the head 20 is provided with grooves 25, clearly shown in Figs. 3 and 4, and a flexible but sturdy strand 26, such as piano wire, is passed through the tube 23, the opening in the boss 22 and into the groove 25 which is disposed in alinement therewith. The wire 26 is passed around half of the head 20, more or less, always lying in the groove 25, and the bend of the wire is passed inwardly through an opening 27 in the rim of the head, the head being dished to receive the sleeve 18. Extending inwardly from the face of the head is a lug 28 through an opening 29 in which the wire 26 extends, as clearly shown in Fig. 3. The wire is held in this position by means of a set-screw 30. It will now be seen that when the wire is pushed or pulled it will not buckle, because it is properly confined at every point, but will serve to rotate the sleeve 18 in a manner to cut off or open up more or less of the air passageway 15.

Referring now to Figs. 5 to 9 inclusive, it will be seen that the stationary element of the adjusting mechanism is in the bottom of the cylindrical casing 31 to the base 32 of which a circular clamp or yoke 33 is secured by means of screws 34, 34, these screws passing from the inside of the casing through openings in the base and having threaded engagement with the enlarged part 35 of the clamp. The face of this enlarged part is planar to correspond with the planar face of the base of the casing. The clamp 33 is split, as indicated at 36, and the parts are held together and sprung upon the steering column of the chamber, as will be described later, by means of a clamping screw 37. Mounted to rotate within the casing 31 is a shell 38, the face 39 of this shell being extended peripherally beyond the rim 40 thereof so that it may form a complete facial cover for the casing. The rim 40 sets in the casing with a bearing fit and is provided with a peripheral groove 41 in part of which the wire 26 is laid, the end of this wire being passed inwardly through an opening 43 in an enlarged part 44 extending inwardly from the rim 40, as illustrated in Figs. 8 and 9. The wire 26 is held in this position by means of a set-screw 45 entering from the outside. The casing 31 is provided with a tangential boss 46 which is adapted to receive the end of a flexible tube 23, the former being split as indicated at 48' so that a set-screw 49' may firmly clamp the latter in place. The wire 26 passes out of the casing through this tube as shown in the drawings. The shell 38 is provided with an axial opening 47 through which an axial stud 48 extending from the base 32 to the casing 31 passes, this stud having a reduced end for the reception of a collar 49 and a clamping nut 50. This arrangement holds the shell against withdrawal and at the same time permits rotary movement which is facilitated by the provision of an operating lever 51. Since the collar 49 is held stationary by means of the nut 50 it may conveniently be provided with a divisional scale, as illustrated in Fig. 5, so that an indicating arrow 52 on the face of the shell 38 may cooperate therewith to apprise the operator of the position of the adjuster. The face of the shell may also be provided with other inscriptions to indicate the direction of movement for certain adjustments, as illustrated in Fig. 5. It will now be seen that the wire which is connected with the rotating head 20 of the carbureter is the same wire which is connected with the rotating shell 38 of the adjusting mechanism, and that the tube 23 which is lodged in the boss 22 of the carbureter is the same tube which is secured in the boss 46 of the adjuster casing. In other words, the adjusting mechanism which has just been described is mechanically connected with the adjustable element of the carbureter by means of a flexible element in the form of a wire confined at all points against buckling by means of a tube surrounding it. When the handle 51 is moved, the sleeve 18 of the carbureter is moved and the size of the air passage is changed. This operation may be had in either direction.

The tendency of the wire to resist bending insures sufficient friction to cause the parts to remain in any position into which they are moved. The element 26 is flexible in the sense that it will withstand considerable bending without danger of breakage but in short lengths this element may be and preferably is relatively stiff. It is thus in effect a very slender column which would tend to buckle when placed under compression.

In Fig. 10 the framework of an automobile is shown at 52. The front hood is shown at 53 and the engine is illustrated at 54. The carbureter 11 is connected with the manifold of the engine, as heretofore pointed out, and the flexible tube 23 containing the wire 26 extends from the carbureter to the casing 31 which is mounted upon the steering column 55, as illustrated in Figs. 6 and 10. Thus, even while the machine is running, the driver may readily adjust the proportion between the air and fuel, in order that the best mixture for the purpose may be had at all times, by merely manipulating the lever 51 and he may have this lever where it bests suits his convenience. In the manipulation of the adjusting mechanism, the movement is limited by the engagement of the enlargement 44 on the shell 38, which engagement engages one or the other of the screw heads 34, 34. At one limit of its movement the leanest mixture is secured and at the other limit the richest mixture is secured.

I claim as new and desire to secure by Letters Patent:

1. In adjusting mechanism for carbureters, a hollow cylindrical casing having a tangential boss, a cylindrical drum closely fitting into said hollow casing and rotatably mounted therein, said boss having a bore tangential with the periphery of said casing, and a single length of relatively stiff wire attached to said drum and passing through said tangential bore, said wire being confined between said casing and drum and by the bore of said boss to prevent buckling when said wire is placed under compression.

2. In adjusting mechanism, a hollow cylindrical casing having a hollow tangential boss, a cylindrical drum closely fitting into said hollow casing and rotatably mounted therein, said drum having a single peripheral groove, a single length of relatively stiff wire attached to said drum and lying in said groove, said hollow boss having its bore tangent to the groove in said drum, a handle attached to said drum to rotate the same positively in either direction, said wire being confined laterally by said groove and said casing to prevent buckling under compression.

3. In combination, a hollow cylindrical casing having a hollow tangential boss, a hollow drum having a peripheral groove closely fitting into said casing, the bore of said hollow boss being substantially tangent to said peripheral groove, a single length of relatively stiff wire attached to said drum, said wire being confined in said boss and in said groove against buckling under compression, and a clamp and means projecting into said hollow drum for attaching said clamp to said casing.

4. In combination, a hollow cylindrical casing having a hollow tangential boss and a stem centrally projecting from said casing, a hollow drum rotatably mounted on said stem and fitting closely within said casing, said drum having a peripheral groove, a head on said drum, a handle mounted on said head, a metal tube fastened in the bore of said tangential boss, said tube having its bore substantially tangent with the groove in said drum, and a single length of relatively stiff wire attached to said drum and supported against lateral movement by said groove, said casing and the metal tube in said boss.

5. In adjusting mechanism for carbureters, a cylindrical casing, a drum rotatably mounted in said casing, a single length of wire only secured to said drum and extending out through the opening in said casing, a handle mounted on said drum, a supporting clamp, screws extending from the inside of said casing through the base thereof and into said clamp and a part carried by said drum for engaging the heads of said screws to limit the movement of said drum.

6. In adjusting mechanism for carbureters, a hollow cylindrical casing, a hollow drum closely fitting in said casing and rotatably mounted therein, said drum having a peripheral groove, a lug projecting radially inward from said hollow drum, a wire secured to said lug and confined in said peripheral groove, said wire extending out through a tangential opening in said casing, a handle mounted on said drum, a supporting clamp, and screws extending from the inside of said casing through the base thereof and into said clamp, said radial lug engaging the heads of said screws to limit the movement of said drum.

7. In an adjusting means for a carbureter, a movable drum, a casing surrounding said drum, said drum being provided with a peripheral groove, a single length of wire attached to said drum and lying in said groove, a tangential guide on said casing, said guide confining said wire against buckling, a handle attached to said drum to move the same in either direction of rotation, and an operated element attached to the end of said wire, said element moved by movement of the handle to place the wire under tension or compression.

8. In an adjusting means for a carbureter, a drum, a casing surrounding said drum, a single length of wire attached to said drum, said drum being provided with a groove for confining said wire against lateral movement, a guide attached tangentially to said casing confining said wire against lateral movement, a second drum having a groove, and a casing surrounding said second drum, said wire being attached to said second drum and confined against lateral movement by the groove in said second drum and the casing surrounding the same, said guide being also attached tangentially to said second casing to confine the wire against buckling throughout its entire length.

9. In combination a pivoted manually operable element having a guiding face to counteract buckling, a second pivoted element to be operated, a transmission element connected to said elements, the said transmission element comprising a single length of relatively stiff wire, a casing surrounding said transmission element to prevent the same from buckling under compression and means for operating said manually operable element to transmit power through said wire by placing the same under tension or compression.

In witness whereof, I hereunto subscribe my name this 31st day of October, 1911.

HERBERT H. FREY.

Witnesses:
ARTHUR H. BOETTCHER,
ALBERT G. MCCALEB.